US008223861B2

(12) United States Patent
Shiue et al.

(10) Patent No.: US 8,223,861 B2
(45) Date of Patent: Jul. 17, 2012

(54) JOINT CARRIER SYNCHRONIZATION AND CHANNEL EQUALIZATION METHOD FOR OFDM SYSTEMS

(75) Inventors: Muh-Tian Shiue, Hsinchu (TW); Chih-Feng Wu, Hsin-Chu (TW); Chorng-Kuang Wang, Taipei (TW)

(73) Assignee: National Central University, Taoyuan County (TW)

( * ) Notice: Subject to any disclaimer, the term of this patent is extended or adjusted under 35 U.S.C. 154(b) by 402 days.

(21) Appl. No.: 12/585,220

(22) Filed: Sep. 9, 2009

(65) Prior Publication Data

US 2010/0239033 A1    Sep. 23, 2010

(30) Foreign Application Priority Data

Mar. 20, 2009   (TW) .............................. 98109273 A

(51) Int. Cl.
*H04K 1/10* (2006.01)
*H04L 27/00* (2006.01)
(52) U.S. Cl. ........................ 375/260; 375/259
(58) Field of Classification Search .................. 375/260, 375/259
See application file for complete search history.

(56) References Cited

U.S. PATENT DOCUMENTS

2005/0068886 A1* 3/2005 Wang et al. .................... 370/210
2007/0275674 A1* 11/2007 Chien ......................... 455/90.2

OTHER PUBLICATIONS

Marco Luise and Ruggero Reggiannini, "Carrier Frequency Acquisition and Tracking for OFDM Systems", IEEE Transactions on Communications, vol. 44, No. 11, Nov. 11, 1996, pp. 1590-1598.
Adel A.M. Saleh, Reinaldo A. Valenzuela, "A Statistical Model for Indoor Multipath Propagation", IEEE Journal on Selected Areas in Communications, vol. SAC-5, No. 2, Feb. 1987, pp. 128-137.
Michael Speth, Stefan A. Fechtel, Gunnar Fock, and Heinrich Meyr, "Optimum Receiver Design for Wireless Broad-Band Systems Using OFDM—Part I", IEEE Transactions on Communications, vol. 47, No. 11, Nov. 1999, pp. 1668-1677.

(Continued)

*Primary Examiner* — David C. Payne
*Assistant Examiner* — Brian J Stevens
(74) *Attorney, Agent, or Firm* — Rosenberg, Klein & Lee

(57) ABSTRACT

A joint carrier synchronization and channel equalization method for OFDM systems, that is suitable for use in a receiver of said orthogonal frequency division multiplexer (OFDM) systems, comprising the following steps: firstly, receiving a reception signal sample of an OFDM symbol, and obtaining simultaneously a phase error and a gain error on each sub-channel in a frequency domain, through outputting a sub-channel signal on each said sub-channel in said frequency domain; next, obtaining an execution carrier frequency offset factor, an execution phase compensation factor, and an execution gain compensation factor based on said phase error and said gain error; and finally, eliminating a phase offset of said reception signal sample of a next symbol in a time domain based on said factors, and compensating a magnitude distortion and a phase distortion on each said sub-channel in said frequency domain for said reception signal of said next symbol.

17 Claims, 7 Drawing Sheets

OTHER PUBLICATIONS

Pei-Yun Tsai, Hsin-Yu Kang, and Tzi-Dar Chiueh, "Joint Weighted Least-Squares Estimation of Carrier-Frequency Offset and Timing Offset for OFDM Systems Over Multipath Fading Channels", IEEE, Transactions on Vehicular Technology, vol. 54, No. 1, Jan. 2005, pp. 211-223.

Kai Shi, Erchin Serpedin, and Philippe Ciblat, "Decision-Directed Fine Synchronization in OFDM Systems", IEEE Transactions on Communications, vol. 53, No. 3, Mar. 2005, pp. 408-412.

Linling Kuang, Zuyao Ni, Jianhua Lu, and Junli Zheng, "A Time-Frequency Decision-Feedback Loop for Carrier Frequency Offset Tracking in OFDM Systems", IEEE Transactions on Wireless Communications, vol. 4, No. 2, Mar. 2005, pp. 367-373.

Jan-Jaap Van De Beck, Magnus Sandell, and Per Ola Borjesson, "ML Estimation of Time and Frequency Offset in OFDM Systems", IEEE Transactions on Signal Processing, vol. 45, No. 7, Jul. 1997, pp. 1800-1805.

B. Come, R. Ness, S. Donnay, L. Van Der Perre, W. Eberle, P. Wambacq, M. Engels, and I. Bolsens, "Impact of Front-End Non-Idealities on Bit Error Rate Performance of WLAN-OFDM Transceivers", Microwave Journal, No. 44, No. 2, Feb. 2001, pp. 126-140.

Muh-Tian Shiue and Syu-Siang Long, "A Blind Frequency-Domain Equalization Algorithm for OFDM/DMT Systems Based on AGC and Carrier Recovery", ITC-CSCC, Jul. 2005.

* cited by examiner

JOINT CARRIER SYNCHRONIZATION AND CHANNEL EQUALIZATION METHOD FOR OFDM SYSTEMS

BACKGROUND OF THE INVENTION

1. Field of the Invention

The present invention relates to a carrier synchronization and channel equalization method, and in particular to a joint carrier synchronization and channel equalization method for OFDM systems.

2. The Prior Arts

In the prior art, a device configuration of a baseband equivalent model for Orthogonal Frequency Division Multiplexer (OFDM) is shown in FIG. 1. Wherein, an inverse discrete Fourier transform (IDFT) 10 and a discrete Fourier transform (DFT) 12 of N points are utilized for a baseband multicarrier modulation and demodulation respectively. Each of OFDM symbols is composed of K data symbols $X_{k,l}$, wherein, k and l represent the indexes of a sub-channel and a symbol respectively. The subcarrier spacing $f_\Delta$ is equal to $1/T_u$, wherein, $T_u$ is a symbol duration. A guard interval is formed by putting $N_g$ discrete signal samples before each of the transmitted symbols, hereby preventing intersymbol interference between signal symbols. Therefore, the signal sample length of a complete OFDM symbol is $N_s = N + N_g$, and its corresponding symbol duration is $T_s = T_u + T_g$. Then, a signal sample in the nth time domain of the lth transmitted OFDM symbol is given by the following formula:

$$x_{n,l} = x(l(N+N_g)T + N_g T + nT) \qquad (1)$$
$$= \sum_{l=-\infty}^{\infty}\left\{ \frac{1}{N}\sum_{\substack{k=-K/2\\k\neq 0}}^{K/2} X_{k,l} e^{j2\pi nk/N} \right\},$$
$$n = -N_g, \ldots, N-1,$$

wherein, $T = T_u/N$ represents a sample interval.

In the structure mentioned above, a channel impulse response of a multi-path fading channel 16 is represented by $h(t) = \Sigma_i h_i(t)\cdot\delta(t-\tau_i)$, wherein, $h_i(t)$ and $\tau_i$ represent, respectively, an attenuation and a delay spread of the ith path, and then the time domain signal samples $x_{n,l}$ are serially sent into a Digital-to-Analog converter (DAC) 14, and then they are transmitted into channel 16, such that channel noises n(t) exists in channel 16. As such, the channel output can be expressed by $y(t) = \Sigma_i h_i(t)\cdot x(t-\tau_i) + n(t)$, wherein, n(t) is a white Gaussian noise with its expectation value as zero-mean. In this framework, the timing frequency offset between a Digital-to-Analog converter (DAC) 14 and an Analog-to-Digital converter (ADC) 22 is assumed to be ideal. The output signal of the channel is damaged by a carrier frequency offset (CFO) effect, thus upon being sampled by an Analog-to-Digital converter (ADC) 22, the nth reception signal sample of the lth OFDM symbol can be expressed by the following formula:

$$y_{n,l} = y(t)\cdot e^{j2\pi\Delta ft}|_{t=l(N+N_g)T + N_g T + NT}, \qquad (2)$$

formula (2) explains that a carrier frequency offset (CFO) $\Delta f$ induces a linear increment of phase offsets in the time domain signals.

Subsequently, upon removing the guard interval from the reception signal samples, the remaining reception signal samples are sent into DFT for demodulation processing. Therefore, the kth sub-channel signal of the ith OFDM symbol can be expressed by the following formula:

$$Y_{k,l} = S_{k,l} + I_{k,l} + N_{k,l} \qquad (3)$$

wherein, $S_{k,l}$, $I_{k,l}$ and $N_{k,l}$ represent a signal term, inter-carrier interference (ICI), and white Gaussian noise on the kth sub-channel respectively. Moreover, $S_{k,l}$ and $I_{k,l}$ can be derived as follows:

$$S_{k,l} = e^{j\pi\phi_{kk}\frac{N-1}{N}} \cdot e^{j2\pi\phi_{kk}\frac{lN_s - N_g}{N}} \cdot si(\pi\phi_{kk}) \cdot H_{k,l} \cdot X_{k,l}, \qquad (4)$$

$$I_{k,l} = \sum_{\substack{q=-K/2\\q\neq k}}^{K/2} e^{j\pi\phi_{qk}\frac{N-1}{N}} \cdot e^{j2\pi\phi_{qq}\frac{lN_s - N_g}{N}} \cdot si(\pi\phi_{qk}) \cdot H_{q,l} \cdot X_{q,l}, \qquad (5)$$

wherein $H_{k,l}$ is a channel response of the kth sub-channel, and it must satisfy the stationary property in an OFDM symbol. In addition, a local subcarrier frequency offset $\phi_{qk}$ and an attenuation factor $si(\pi\phi_{qk})$ can be expressed by the following formula:

$$\phi_{qk} = q - k + \varepsilon \qquad (6.1)$$

$$si(\pi\phi_{qk}) = \frac{\sin(\pi\varepsilon)}{N\sin\left(\frac{\pi(q-k+\varepsilon)}{N}\right)} \qquad (6.2)$$

wherein, $\varepsilon = \Delta fNT$ is a normalized CFO, and it represents the amount of $\Delta f$ transferred from the time domain to the frequency domain through DFT. It is evident that the attenuation factor and ICI term are proportional to $\varepsilon$, as shown in formulae (5), (6.1) and (6.2).

In view of the fact that $\varepsilon$ in formulae (6.1) and (6.2) is extremely small, while the system enters into a tracking stage, then $si(\pi\phi_{kk})$ is very close to 1 and $si(\pi\phi_{qk})$ almost approaching zero. As such, $si(\pi\phi_{kk})$ in formula (4) can be ignored, and the ICI term in formula (3) can be eliminated. Upon performing the simplification mentioned above, an equivalent channel response $\tilde{H}_{k,l}$ on the kth sub-channel can be expressed in polar coordinate as follows:

$$\tilde{H}_{k,l} \approx e^{j\pi\phi_{kk}\frac{N-1}{N}} \cdot e^{j2\pi\phi_{kk}\frac{lN_s - N_g}{N}} \cdot G_{H_{k,l}} \cdot e^{j\theta_{H_{k,l}}} \approx G_{k,l} \cdot e^{j\theta_{k,l}} \qquad (7)$$

wherein, $\theta_{H_{k,l}}$ and $G_{H_{k,l}}$ represent the phase and the magnitude distortions on the kth sub-channel $H_{k,l}$ namely $$H_{k,l} = G_{H_{k,l}} \cdot e^{j\theta_{H_{k,l}}}.$$

In addition, $G_{k,l} = G_{H_{k,l}}$ and $$\theta_{k,l} = \pi\phi_{kk}\frac{N-1}{n} + 2\pi\theta_{kk}\frac{lN_s - N_g}{N} + \theta_{H_{k,l}}.$$

Finally, formula (3) can be rearranged as $$Y_{k,l} = \tilde{H}_{k,l} \cdot X_{k,l} + N_{k,l} \qquad (8)$$

In order to resolve the adverse effects caused by the CFO and the channel distortion to a received signal, thus a carrier synchronization and a channel equalization techniques are proposed to overcome these problems. In a framework of the prior arts, the carrier synchronization technique is realized by a frequency control loop having an individual frequency detector. However, such a frequency estimation mechanism is not a perfect process. In practice, the carrier frequency jitter will not be zero. Therefore, such a phenomenon will result in the constellation rotation on each sub-channel in an OFDM system, hereby further degrading the system performance. In a practical OFDM system, a carrier phase compensation on each sub-channel is necessary to overcome the constellation rotation.

In addition, in OFDM transmission system, in general, a channel estimation method utilized on each sub-channel is based on the least square (LS) algorithm. However, this method is not very accurate. The residual CFO will destroy the accuracy of the channel estimation on each sub-channel since the residual CFO has not been fully removed. As such, when the carrier synchronization process enters into a tracking stage, the channel information on each sub-channel has to be updated by the least-mean square (LMS) algorithm to track the channel variations.

For the reasons mentioned above, in general, the carrier frequency synchronization and the channel equalization are restrained based on an individual cost function. Furthermore, the mutual interference will occur between the carrier frequency synchronization and the channel equalization to degrade the system performance, namely increase Bit Error Rate (BER) for an OFDM system.

As such, presently, the performance of the carrier frequency synchronization and the channel equalization techniques of the prior art is still not quite satisfactory, and it has much room for improvements.

SUMMARY OF THE INVENTION

In view of the problems and shortcomings of the prior arts, the present invention provides a joint carrier synchronization and channel equalization method for OFDM systems, so as to solve the problems of the prior arts.

A major objective of the present invention is to provide a joint carrier synchronization and channel equalization method for OFDM systems, wherein, a single cost function mechanism is employed to minimize the error power on each sub-channel and to further maximize the sub-channel SNR concurrently. The joint method is used to obtain the phase error and the gain error of each sub-channel signal simultaneously, hereby to solve the problems caused by the CFO and the channel distortion, further to increase the system performance of an OFDM system, and also to minimize Bit-Error-Rate (BER) for the OFDM system.

In order to achieve the above-mentioned objectives, the present invention provides a joint carrier synchronization and channel equalization method, that is suitable for use in a receiver of an OFDM system, including the following steps: firstly, receiving a reception signal sample of an OFDM symbol, then outputting a sub-channel signal in the frequency domain, while obtaining a phase error and a gain error of each sub-channel simultaneously. Next, obtaining an execution phase compensation factor based on phase error on each sub-channel, and obtaining an execution carrier frequency offset factor after calculating an average value of the summed-up phase error for all sub-channels, then obtaining an execution gain compensation factor based on a gain error on each sub-channel. Subsequently, through first multiplying an execution carrier frequency offset factor by a reception signal sample of a next OFDM symbol, thus eliminating the phase offset in a reception signal sample in time domain. Finally, in a next step, the magnitude distortion and the phase distortion on each sub-channel signal in the frequency domain are compensated, respectively, by using the sub-channel signal generated by multiplying an execution gain compensation factor and an execution phase compensation factor by a reception signal sample of a next OFDM symbol.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
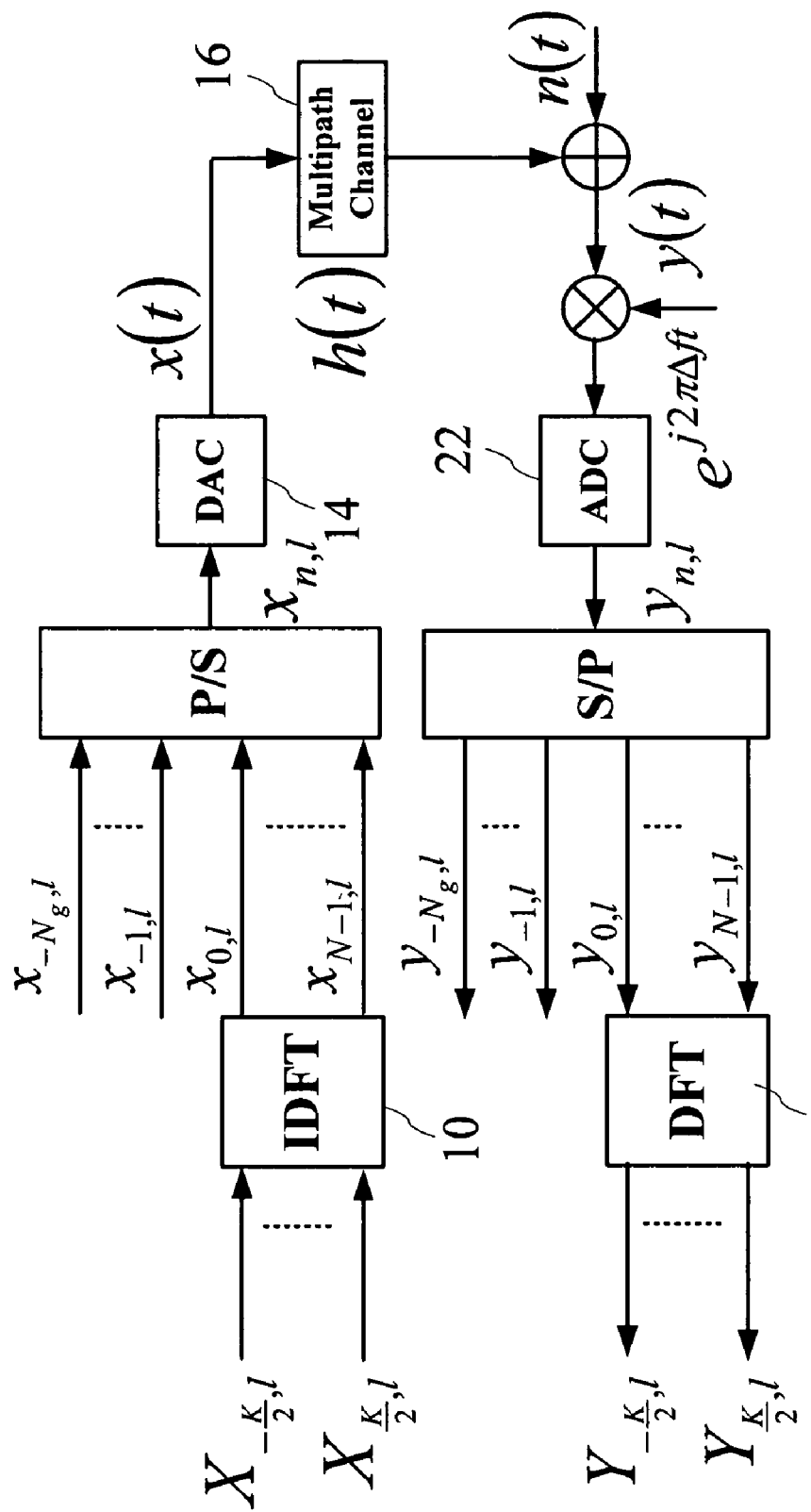
FIG. 1 is a device configuration of a baseband equivalent model for orthogonal frequency division multiplexer (OFDM) according to the prior art.
Figure 2:
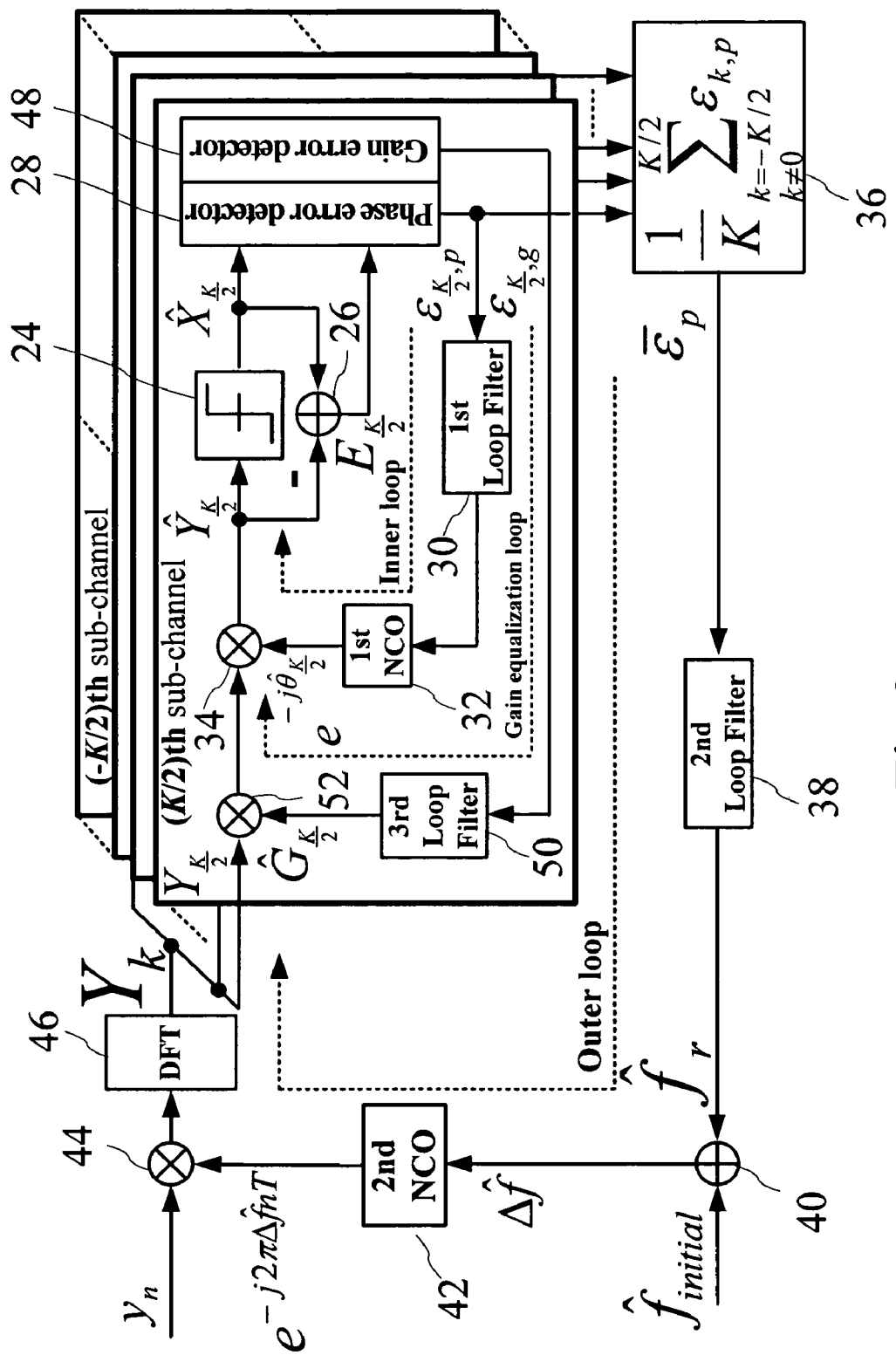
FIG. 2 is a schematic diagram of a joint carrier synchronization and channel equalization device according to a first embodiment of the present invention.

Firstly, referring to FIG. 1 for a device configuration of a baseband equivalent model for orthogonal frequency division multiplexer (OFDM) according to the prior arts, wherein, it is found that the carrier frequency offset (CFO) $\Delta f$ causes a linear increment of phase offset in the time domain signals. In order to solve this problem of the prior art, the present invention proposes a joint carrier synchronization and channel equalization device, that is suitable for use in a receiver of an OFDM system, as shown in FIG. 2 for a schematic diagram of a device according to a first embodiment of the present invention.

In the following descriptions referring to FIG. 2. As shown in FIG. 2, a joint carrier synchronization and channel equalization device mainly includes a dual-loop carrier synchronization device and K gain equalization loops. The dual-loop carrier synchronization device includes K inner loops in frequency domain and an outer loop in time domain. The inner loop is constructed individually on each sub-channel in the frequency domain. Each inner loop includes a signal slicer 24, a decision error element 26, a phase error detector 28, a first loop filter 30, a first numerically-controlled oscillator (NCO) 32, and a multiplier used as an inner loop compensator 34. Wherein, signal slicer 24 is connected in parallel with a decision error element 26, and signal slicer 24 is connected to the following devices in sequential order: a phase error detector 28, a first loop filter 30, a first numerically-controlled oscillator (NCO) 32, an inner loop compensator 34, and finally the inner loop compensator 34 is connected to a signal slicer 24.

Furthermore, the outer loop includes an average phase error calculator 36, a second loop filter 38, an adder 40, a second numerically-controlled oscillator (NCO) 42, a de-rotator 44, a discrete Fourier transformation 46. Wherein, all the elements included in an outer loop are connected in the above-mentioned sequence, and an average phase error calculator 36 is connected to a phase error detector 28 on each sub-channel in the frequency domain.

In addition, a gain equalization loop is also constructed on each sub-channel in the frequency domain. The gain equalization loop includes a signal slicer 24, a decision error element 26, a gain error detector 48, a third loop filter 50, and a multiplier used as a gain equalization compensator 52. Wherein, the signal slicer 24 and the decision error element 26 are shared by an inner loop, and signal slicer 24 are connected in parallel with decision error element 26; and the signal slicer 24 are connected to the following devices in a sequential manner: a gain error detector 48, a third loop filter 50, a gain equalization compensator 52, and an inner loop compensator 34; finally, the inner loop compensator 34 is connected to signal slicer 24. Moreover, the gain equalization compensator 52 is connected to the discrete Fourier transformation 46 of the outer loop.

Through the application of the present invention, the problems of the residual carrier frequency offset (CFO) and the channel equalization can be solved simultaneously. From the system performance point of view, as long as the power of decision error signal on each sub-channel can be minimized, then the system performance can be enhanced. Therefore, based on the minimum mean square error (MMSE), the cost function J(•) of the joint carrier synchronization and channel equalization method is presented to minimize the power of the decision error signal on each sub-channel, as represented by the following formula:

$$\underset{\hat{G}_k \text{ and } \hat{\theta}_k}{\arg\min} J(\hat{G}_k, \hat{\theta}_k) = E_k = E[|E_k|^2] = E[|\hat{X}_k - \hat{Y}_k|^2], \quad (9)$$

wherein, E[•] is an expectation operator. k represents the sub-channel index in the frequency domain. $E_k$ and $E_k$ represent respectively a decision error value of a decision error signal and the power of decision error signal on the kth sub-channel, and $\hat{Y}_k$ is a equalized sub-channel signal of a sub-channel signal $Y_k$ after the gain compensation and the phase compensation as performed by the gain equalization compensator 52 and the inner loop compensator 34. $\hat{X}_k$ is the sub-channel decision signal as performed by a signal slicer 24. $\hat{G}_k$ and $\hat{\theta}_k$ are the compensated gain and the compensated phase on the kth sub-channel in the frequency domain respectively, and the derivations of the signals and parameters mentioned above will be described in more detail in the following. Conceptually, the signal-to-noise ratio (SNR) on the kth sub-channel can be expressed as $$SNR_k = \frac{S_k}{E_k}, \quad (10)$$

wherein, $S_k$ is the signal power on the kth sub-channel. In formulae (9) and (10), it is described that, the accurate phase and gain factors are able to make the power of the decision error signal on the kth sub-channel minimum as well as the signal-to-noise ratio (SNR) on the kth sub-channel maximum simultaneously. Therefore, the closed-loop control technique is used to obtain the accurate phase compensation factor and gain compensation factor on the kth sub-channel, hereby realizing a method of joint carrier synchronization and channel equalization.

Figure 3:
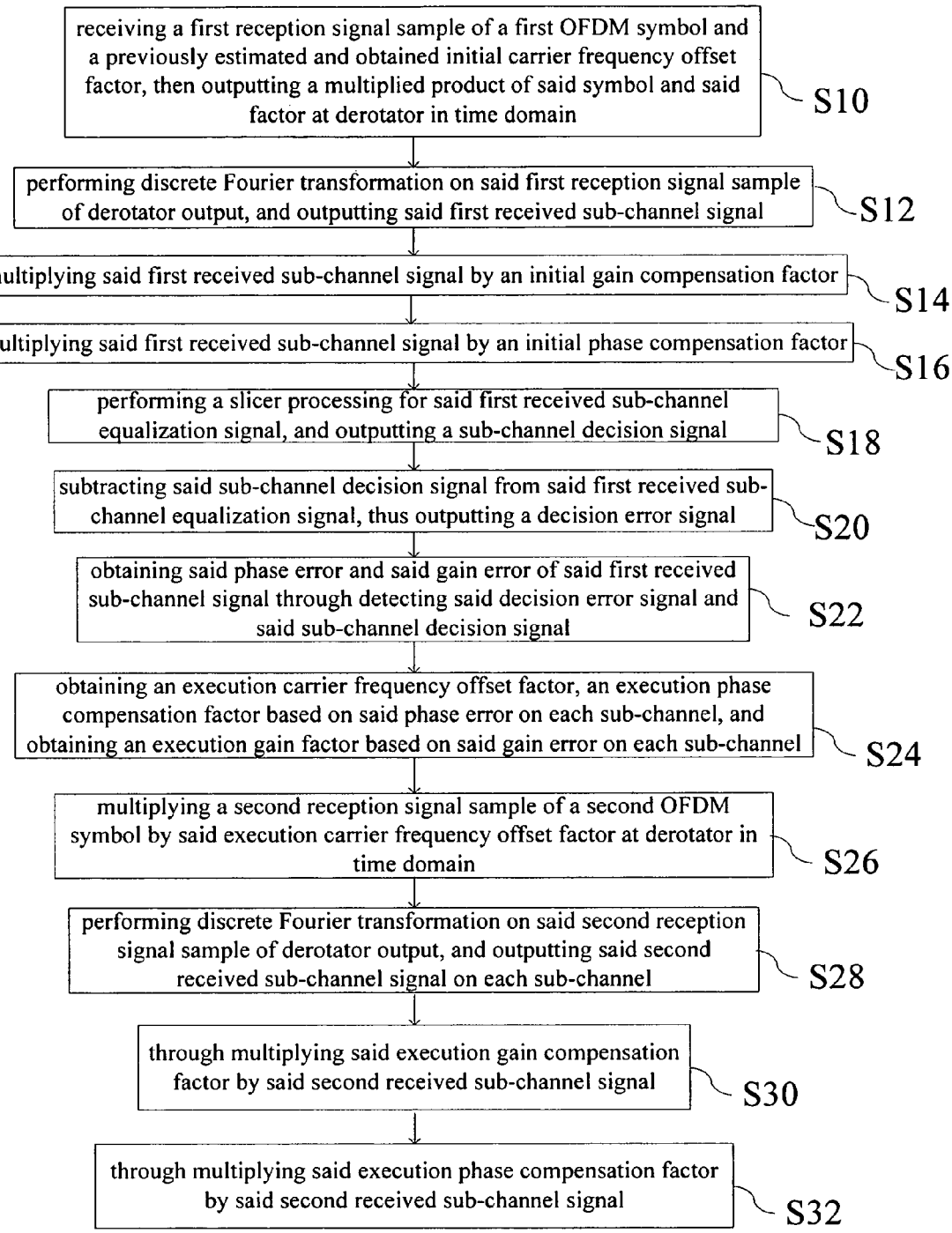
FIG. 3 is a flow chart of a joint carrier synchronization and channel equalization method according to a first embodiment of the present invention.

Subsequently, referring to FIG. 3 for a flow chart of a joint carrier synchronization and channel equalization method according to a first embodiment of the present invention. As shown in FIG. 3, when receiving a reception signal sample of a first OFDM symbol, both the initial gain and phase factors are respectively available on a third loop filter 50 and a first numerically-controlled oscillator (NCO) 32 of a joint carrier synchronization and channel equalization device. Namely, at this time, the gain factor $\hat{G}_k$ and phase compensation factor $e^{-j_k}$ in FIG. 3 are defined respectively as an initial gain factor and an initial phase compensation factor. Moreover, when receiving a reception signal sample of a first OFDM symbol, a second numerically-controlled oscillator (NCO) 42 will output an initial carrier frequency offset factor $e^{-j\Phi_n}$, wherein, $\phi_n = 2\pi\Delta\hat{f}nT$, T is a single signal sample interval, $\Delta\hat{f}$ is equal to an initial CFO $\hat{f}_{initial}$, the residual CFO $\hat{f}_r$ is equal to 0.

Furthermore, the initial gain and phase factors on a kth sub-channel can be acquired based on a training symbol, such as the long preamble in IEEE 802.11a, and represented as $$\hat{G}_k = \frac{|X_k|}{|Y_k|} \quad (11)$$

$$\hat{\theta}_k = \tan^{-1}(X_k \cdot Y_k^*) \quad (12)$$

where $X_k$ and $Y_k$ are the transmitted and the received training symbols on the kth sub-channel respectively.

Therefore, upon receiving signals at the first time, as shown in Step S10, the de-rotator 44 is used to receive a first reception signal sample of a first OFDM symbol with CFO effect, namely, at this time, the $y_n$ in FIG. 3 is defined as a first reception signal sample, then output the resulting product of multiplying the initial CFO $\hat{f}_{initial}$ factor by the first reception signal sample. Then, as shown in step S12, the discrete Fourier transformation 46 is used to receive the first reception signal sample from the de-rotator 44, perform discrete Fourier transformation on the sample, and output a first received sub-channel signal on each sub-channel in the frequency domain, namely, at this time, $Y_k$ is defined as a first received sub-channel signal in FIG. 3. Subsequently, as shown in step S14, a gain compensation compensator 52 is used to receive an initial gain factor and a first received sub-channel signal, and output a resulting product of multiplying the initial gain factor by the first received sub-channel signal, so as to compensate a magnitude distortion of the first received sub-channel signal on each sub-channel in the frequency domain. Furthermore, as shown in step S16, an inner loop compensator 34 is used to receive an initial phase compensation factor, and also receive a first received sub-channel signal from a gain compensation compensator 52, and output a first received sub-channel equalization signal after multiplying the initial phase compensation factor by the first received sub-channel signal. Namely, at this time, $\hat{Y}_k$ in FIG. 3 is defined as a first received sub-channel equalization signal, thus compensating the phase distortion of the first received sub-channel signal on each sub-channel in the frequency domain.

Subsequently, upon completing the execution of step S16, then proceeding with the execution of step S18. At this time, a signal slicer 24 is used to receive a first received sub-channel equalization signal from the output of the phase compensator of the inner loop 34, and perform a slicing processing for a first received sub-channel equalization signal, hereby outputting a sub-channel decision signal $\hat{X}_k$. Then, as shown in step S20, a decision error element 26 is used to receive a sub-channel equalization signal and a first received sub-channel decision signal, and output a decision error signal after subtracting a first received sub-channel equalization signal from the sub-channel decision signal. Furthermore, as shown in step S22, a phase error detector 28, and a gain error detector 48 are utilized separately to detect and obtain simultaneously a phase error and a gain error of each sub-channel signal in the frequency domain based on formulae (3) and (4) by using a decision error signal and a sub-channel decision signal, and outputting the phase error and the gain error thus obtained.

$$\epsilon_{k,p} = \text{Im}(\hat{X}_k E^*_k), \tag{13}$$

$$\epsilon_{k,g} = \text{Re}(\hat{X}_k E^*_k), \tag{14}$$

wherein, Re(•), Im(•) and * represent respectively a real-part, an imaginary-part, and a complex-conjugate operators, $\hat{X}_k$ is a decision signal on the kth sub-channel, and $E_k$ is a decision error on the kth sub-channel corresponding to the decision signal $\hat{X}_k$ and the equalized signal $\hat{Y}_k$.

Moreover, upon completing the execution of step S22, proceeding with the execution of step S24. At this time, proceeding with obtaining an execution carrier frequency offset factor $\Delta\hat{f} = \hat{f}_{initial} + \hat{f}_r$, an execution phase compensation factor $e^{-j\hat{\epsilon}_k}$ based on a phase error on each sub-channel in the frequency domain, and obtaining an execution gain compensation factor $\hat{G}_k$ based on gain error on each sub-channel. Namely, at this time, the carrier frequency offset factor $e^{-j2\pi\Delta\hat{f}nT}$, the phase compensation factor $e^{-j\hat{\epsilon}_k}$, and the gain compensation factor $\hat{G}_k$ are defined respectively as the execution carrier frequency offset factor, the execution phase compensation factor, and the execution gain compensation factor mentioned above. Since the execution carrier frequency offset factor, the execution phase compensation factor, and the execution gain compensation factor are obtained respectively through utilizing an outer loop, an inner loop, and a gain equalization loop, as such, the outer loop can be referred to as a frequency tracking loop, the inner loop can be referred to as a phase tracking loop. And the method utilized in obtaining the various factors mentioned above is described in detail as follows.

A first loop filter 30 of an inner loop is used to receive a phase error output by a phase error detector 28, and then output a compensation phase $\hat{\theta}_k$ thus obtained. Then, a first numerically-controlled oscillator (NCO) 32 is used to receive this compensation phase, and calculate to obtain an execution phase compensation factor $e^{-j\hat{\epsilon}_k}$ based on the compensation phase.

An average phase error calculator 36 of an outer loop is used to receive a phase error output by a phase error detector 28 of each sub-channel in the frequency domain, and the phase errors for all sub-channels are summed up according to formula (15), then the result of this summation is an average phase error.

$$\bar{\epsilon}_p = \frac{1}{K} \sum_{\substack{k=-K/2 \\ k \neq 0}}^{K/2} \epsilon_{k,p}, \tag{15}$$

wherein, k represents the sub-channel index in the frequency domain, $\epsilon_{k,p}$ is a phase error on the kth sub-channel, $\bar{\epsilon}_p$ is an average phase error of all sub-channels.

Subsequently, a second loop filter 38 is used to receive this average phase error, and output an estimated residual CFO thus obtained, namely $\hat{f}_r$. Then, an adder 40 is used to receive this estimated residual CFO $\hat{f}_r$ and an initial CFO $\hat{f}_{initial}$, and add them together to obtain a compensation CFO, namely $\Delta\hat{f} = \hat{f}_{initial} + \hat{f}_r$. Finally, a second numerically-controlled oscillator (NCO) 42 is used to receive this compensation CFO, and calculate to obtain an execution carrier frequency offset factor $e^{-j\phi_n}$ based on the compensation CFO $\Delta\hat{f}$, wherein, $\phi_n = 2\pi\Delta\hat{f}nT$ and T is a signal sample interval.

In addition, a third loop filter 50 of gain equalization loop is used to receive a gain error output by a gain error detector 48, and then output a execution gain compensation factor $\hat{G}_k$ of a real number thus obtained.

Upon obtaining all the execution gain compensation factor, the execution phase compensation factor, and the execution carrier frequency offset factor, then proceeding with execution of step S26. At this time, a de-rotator 44 will receive again a reception signal sample of an OFDM symbol in the second time. Herein, the signal is defined as a second reception signal sample of a second OFDM symbol, and at this time, the $y_n$ in FIG. 3 is defined as a second reception signal sample. Moreover, the de-rotator 44 is used to receive an execution carrier frequency offset factor, and multiply the second reception signal sample by the execution carrier frequency offset factor, so that a carrier frequency error $f_e = \Delta f - \Delta\hat{f}$ is reduced to a minimum, so as to eliminate phase offset of the second reception signal sample in a time domain as caused by CFO $\Delta f$. Therefore, the output of the de-rotator 44 can be expressed as:

$$\hat{y}_{n,J} = y_{n,J} e^{-j\phi_n} \text{ and } \phi_n = 2\pi\Delta\hat{f}nT \tag{16}$$

Then, upon completing the execution of step S26, then proceeding with the execution of step S28. At this time, discrete Fourier transformation 46 is used to receive a second reception signal sample from de-rotator 44, and perform discrete Fourier transformation on the second reception signal sample, such that outputting a second received sub-channel signal on each sub-channel in the frequency domain, namely, at this time, the $Y_k$ in FIG. 3 is defined as a second received sub-channel signal.

Subsequently, as shown in step S30, a gain equalization compensator 52 is used to receive a second received sub-channel signal and an execution gain compensation factor, then multiply the signal and the gain compensation factor, thus compensating the magnitude distortion of a second received sub-channel signal on each sub-channel in the frequency domain.

Afterwards, proceeding with execution of step S32, during which, an inner loop compensator 34 is used to receive an execution phase compensation factor, and receive a second received sub-channel signal having its magnitude distortion compensated from a gain equalization compensator 52, multiply the signal and the received execution phase compensation factor, and then output a second received sub-channel equalization signal, namely, at this time, $\hat{Y}_k$ in FIG. 3 is defined as a second received sub-channel equalization signal, so as to compensate phase distortion of the second received sub-channel signal on each sub-channel in the frequency domain, as such being capable of eliminating the constellation rotation of each sub-channel in the frequency domain as caused by the carrier frequency jitter and the sub-channel phase variation.

Upon receiving again a reception signal sample of a next OFDM symbol, the de-rotator 44 may proceed with phase and gain compensations for a reception signal sample of a next OFDM symbol in a same manner as utilizing a first reception signal sample in compensating a second reception signal sample. Namely, proceeding with compensation by using the carrier frequency offset factor $e^{-j2\pi\Delta\hat{f}nT}$, phase compensation factor $e^{-jk}$, and gain compensation factor $\hat{G}_k$ obtained by a second reception signal sample. In other words, when each sub-channel signal at the output of the discrete Fourier transformation 46 is processed through steps S26, S30, S32, the ultimately compensated signal is $\hat{Y}_k = \hat{G}_k \cdot e^{-jk} \cdot Y_k$.

Figure 4:
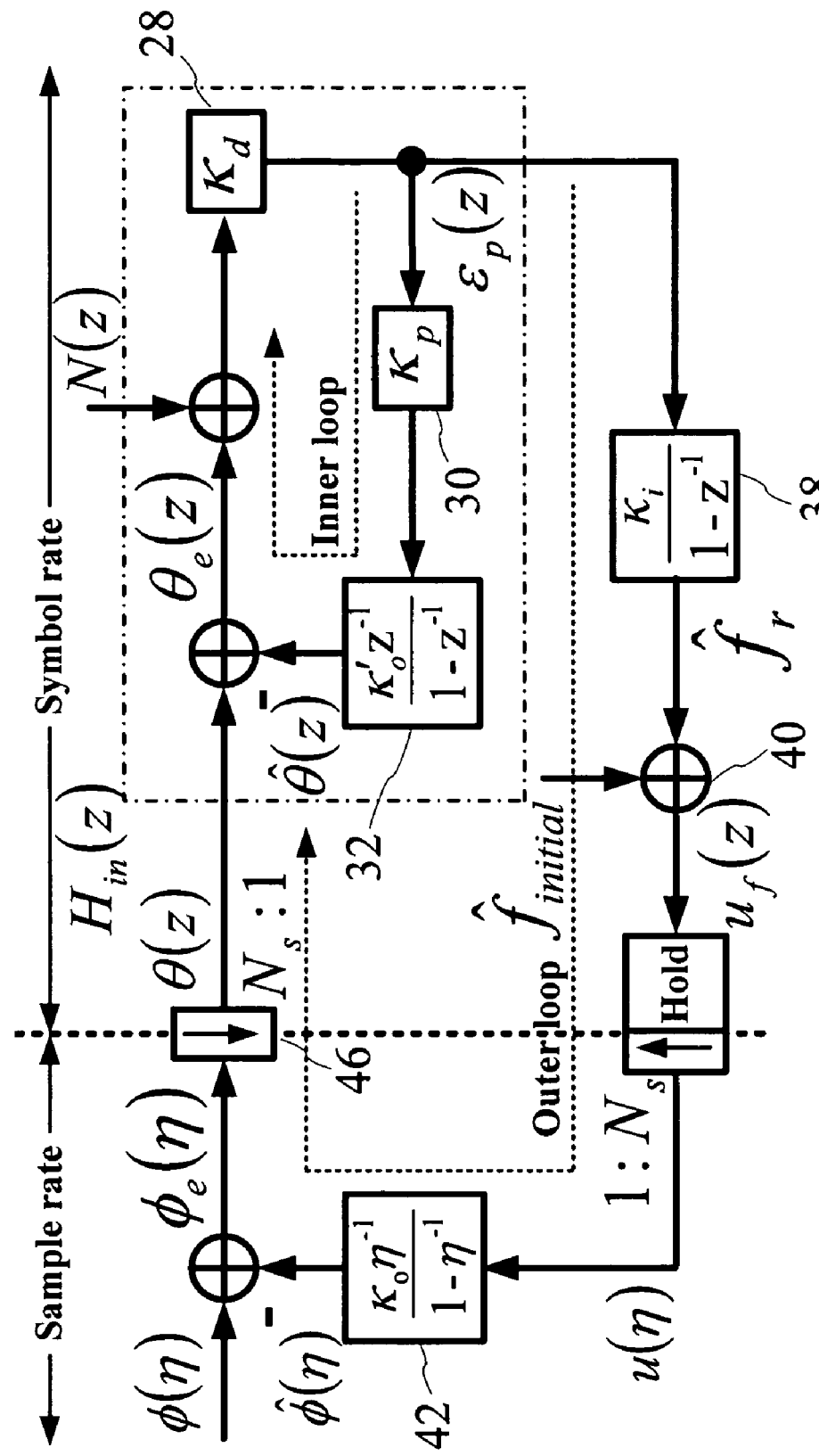
FIG. 4 is a schematic diagram of a closed-loop model of the carrier synchronization loop according to a first embodiment of the present invention.

In order to derive the phase variation on each sub-channel, the phase transfer function of each loop must be derived as described below, meanwhile, referring to FIG. 4, wherein, z represents z-domain transformation variables operated on a symbol rate, and η represents z-domain transformation variables operated on a sample rate.

In the inner loop, the first loop filter 30 is a proportional controller with gain $\kappa_p$. Based on this result, the inner loop is constructed by utilizing a type-1 digital phase-locked loop (DPLL). Actually, the inner loop is realized on each sub-channel in the frequency domain. Wherein, the "type" means the number of integrators within a closed-loop. The phase transfer function $H_i(z)$ and phase error transfer function $E_i(z)$ of the inner loop can be derived as follows:

$$H_i(z) = \frac{\hat{\theta}(z)}{\theta(z)} = \frac{\kappa_1}{z - (1 - \kappa_1)} \text{ and } E_i(z) = \frac{\theta_e(z)}{\theta(z)} = \frac{z-1}{z - (1 - \kappa_1)}, \quad (17)$$

wherein θ(z) is a phase of a sub-channel signal output by a discrete Fourier transformation 46, $\hat{\theta}(z)$ is a phase of a sub-channel signal output by a first numerically-controlled oscillator (NCO) 32, and $\theta_e(z) = \theta(z) - \hat{\theta}(z)$. $\kappa_i = \kappa_d \kappa_o' \kappa_p$ is an open loop gain. $\kappa_d$ is a gain of a phase error detector 28. $\kappa_o'$ is a gain of a first numerically-controlled oscillator (NCO) 32 of the inner loop. The subscripts k as shown in $H_i(z)$ and $E_i(z)$ are omitted since $\kappa_i$ is the same for all sub-channels. The stability condition of the inner loop $H_i(z)$ must satisfy the condition $0<\kappa_i<2$, since in this condition the pole of $H_i(z)$ is located within the unit circle.

Since the gain equalization loop on each sub-channel is a first order equalization loop, and its loop equation can be expressed as $$\hat{G}_k(l) = \hat{G}_k(l-1) + \mu_g \epsilon_{k,g}(l-1) \quad (18)$$

wherein, l is a symbol index. $\mu_g$ is an open loop gain step-size. $\epsilon_{k,g}$ is a gain error on the kth sub-channel, and gain compensation factor $\hat{G}_k$ is a real number.

For a gain equalization loop on each sub-channel, the gain compensation factor on a gain equalization loop must be updated for every OFDM symbol. As such, in a tracking stage, the gain error will gradually decreases to a very small value. The closed-loop transfer function of the first order loop can be expressed as $$H_g(z) = \frac{\mu_g}{z - (1 - \mu_g)}, \quad (19)$$

wherein, the subscript k is omitted since the open loop gain $\mu_g$ is the same for all sub-channels. Evidently, the stability condition of $H_g(z)$ must satisfy the condition $0<\mu_g<2$, because in this condition the pole is located within the unit circle.

In the following description, please refer to FIG. 5 at the same time, wherein, the second loop filter 38 of the outer loop is designed by using an integrator with gain $\kappa_i$. Therefore, the outer loop is a type-2 digital phase-locked loop.

The outer loop is operated over two-rate regions, namely, sample-rate, and symbol-rate. In addition, K inner loops are located in the outer loop, and the carrier phase error caused by CFO is identical for all sub-channels. Therefore, K inner loops can be simplified into a single loop to derive the outer loop transfer function. In addition, the average phase error can be ignored in the signal flow graph as shown in FIG. 4. As such, the transfer function $H_{in}(z)$ of the inner loop 54, enclosed by dash-dot lines in FIG. 4, can be expressed as follows:

$$H_{in}(z) = \frac{\epsilon_p(z)}{\theta(z)} = \kappa_d E_i(z) = \frac{\kappa_d(z-1)}{z - (1 - \kappa_1)} \quad (20)$$

Figure 5:
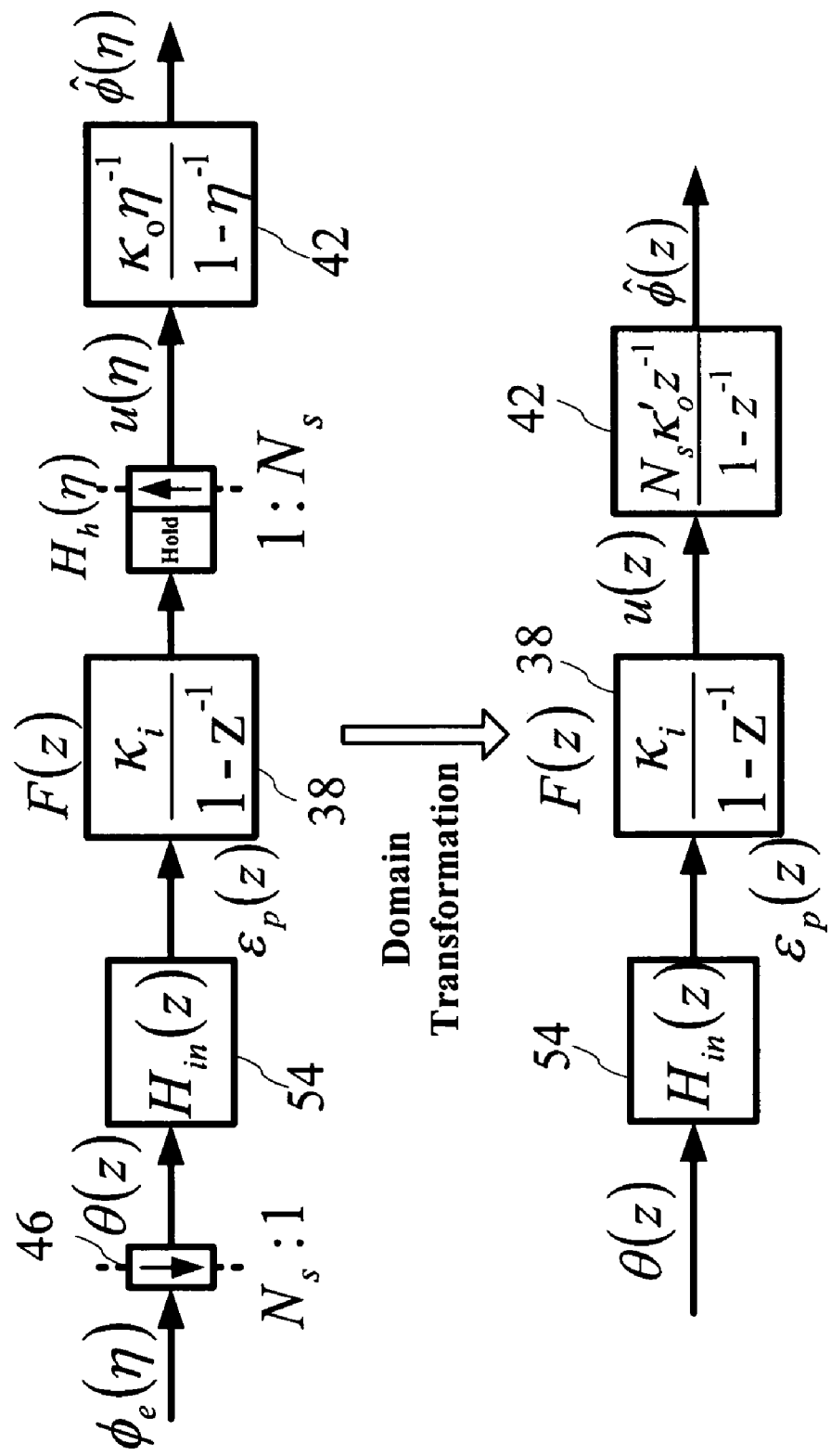
FIG. 5 is a schematic diagram of an open loop model of the carrier synchronization loop for the domain transformation according to a first embodiment of the present invention.

According to a domain transformation as shown in FIG. 5, the open loop transfer function of the outer loop can be expressed as $$F(z) = \frac{\hat{\phi}(z)}{\phi_e(z)} = \frac{\kappa_2 z}{(z-1)[z - (1 - \kappa_1)]} \quad (21)$$

wherein, $\hat{\phi}(z)$ is the phase information of the output of a second numerically-controlled oscillator (NCO) 42 in the time domain, $\phi_e(z)$ is the phase error of the output of de-rotator 144 in the time domain, and $\kappa_2 = \kappa_d \kappa_o \kappa_i$ is an open loop gain of the outer loop. $\kappa_o$ is a gain of a second numerically-controlled oscillator (NCO) 42 of the outer loop. Based on F(z), the phase transfer function $H_o(z)$ and the phase error transfer function $E_o(z)$ of the outer loop can be derived as $$H_0(z) = \frac{\hat{\phi}(z)}{\phi(z)} = \frac{\kappa_2 z}{(z-1)[z - (1 - \kappa_1)] + \kappa_2 z}, \quad (22)$$

$$E_0(z) = \frac{\phi_e(z)}{\phi(z)} = \frac{(z-1)[z - (1 - \kappa_1)]}{(z-1)[z - (1 - \kappa_1)] + \kappa_2 z}, \quad (23)$$

wherein, φ(z) is a phase information of each signal sample of an received OFDM symbol in the time domain.

Moreover, the dual-loop carrier synchronization device can not only track CFO in time domain by using the outer loop, but it can also recover the residual CFO jitter and the sub-channel phase distortion through utilizing the inner loop on each sub-channel in the frequency domain. Therefore, the phase transfer function $H_d(z)$ and the phase error transfer function $E_d(z)$ of the dual-loop carrier synchronization loop can be expressed as $$H_d(z) = \frac{\hat{\theta}(z)}{\phi(z)} = \frac{\kappa_1(z-1)}{(z-1)[z-(1-\kappa_1)] + \kappa_2 z}, \quad (24)$$

$$E_d(z) = \frac{\theta_e(z)}{\phi(z)} = \frac{(z-1)^2}{(z-1)[z-(1-\kappa_1)] + \kappa_2 z}. \quad (25)$$

Figure 6:
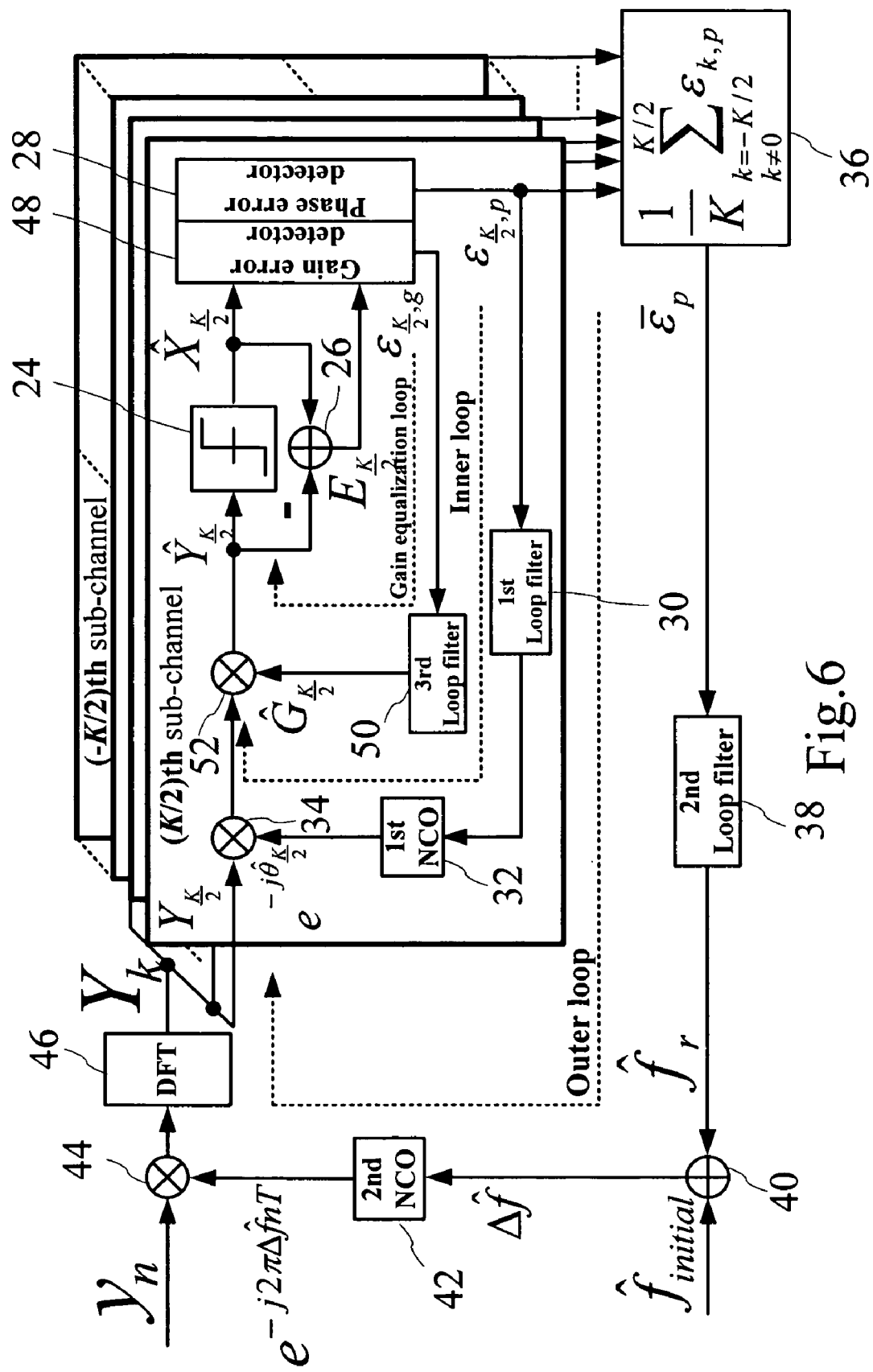
FIG. 6 is a schematic diagram of the joint carrier synchronization and channel equalization device according to a second embodiment of the present invention.

Subsequently, referring to FIG. 6 for a schematic diagram of a joint carrier synchronization and channel equalization device according to a second embodiment of the present invention. As shown in FIG. 6, the differences between its contents and those of FIG. 2 are that the connections between the inner loop and the gain equalization loop are different, while the elements and intra-connection relations in the inner loop and the gain equalization loop respectively are the same, however, in FIG. 6, the inner loop compensator 34 is connected to a discrete Fourier transformation 46 and the gain equalization compensator 52. Furthermore, with regard to operation manner, the difference between the second embodiment and the first embodiment is that, in the latter, the sequence of compensation on each sub-channel signal $Y_k$ is that, the signal $Y_k$ will first be phase-compensated by the inner loop compensator 34, and then it will be gain-compensated by the gain equalization compensator 52. Namely, in this manner, the operation sequence of a joint carrier synchronization and channel equalization device of FIG. 6 correspond to that of FIG. 3, but with the exceptions that the exchange of operation sequence of steps S14 and S16, and the exchange of operation sequence of steps S30 and S32.

Figure 7:
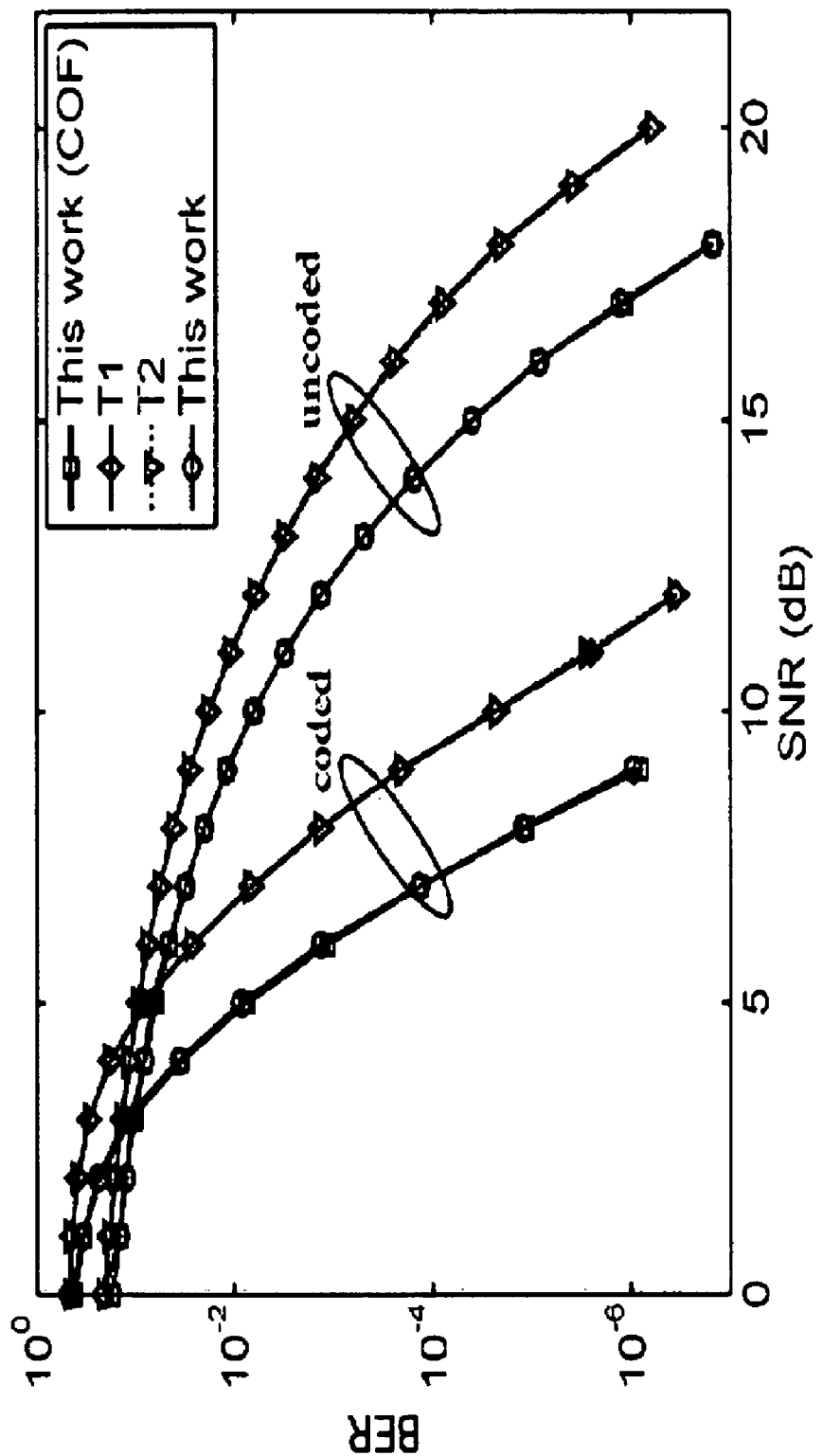
FIG. 7 shows simulation curves of bit-error-rate (BER) vs signal-to-noise ratio (SNR) used for IEEE 802.11a Wireless Local Area Network (WLAN) platform according to the present invention.

Finally, referring to FIG. 7 for simulation curves of bit-error-rate (BER) vs. signal-to-noise ratio (SNR) used for IEEE 802.11a Wireless Local Area Network (WLAN) platform according to the present invention. As shown in FIG. 7, the joint carrier synchronization and channel equalization method of the present invention has been tested and verified as correct and feasible on an IEEE 802.11a Wireless Local Area Network (WLAN) platform, and the bit-error-rate (BER) simulation results are as shown in FIG. 7. Wherein, the square-shaped data points indicate the carrier frequency offset is zero in the time domain, i.e., Δf=0, while the circle-shaped data points indicate the residual CFO $f_r$ is 156 Hz. In this Figure, the device and method utilized in the present invention are compared with other template architectures T1 and T2 of the prior arts, regardless of whether the transmitted data are a coded or not. From this Figure, it can be seen that through the application of the present invention, an optimized system performance can be achieved, namely, the Bit-Error-Rate (BER) of an OFDM transmission system can be effectively minimized.

Summing up the above, in the present invention, a single cost function mechanism is used to obtain the phase error and the gain error on each sub-channel signal simultaneously, thus solving the carrier synchronization and the channel equalization problems, increasing the system performance of an OFDM transmission system, and minimizing the Bit-Error-Rate (BER) of an OFDM transmission system.

The above detailed description of the preferred embodiment is intended to describe more clearly the characteristics and the spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A joint carrier synchronization and channel equalization method for OFDM systems, that is suitable for use in a receiver of said OFDM (Orthogonal Frequency Division Multiplexing) systems, comprising the following steps:
    (A) receiving a first reception signal sample of a first OFDM symbol in a joint carrier synchronization and channel equalization device, then outputting a first received sub-channel signal on each sub-channel in a frequency domain, meanwhile, simultaneously obtaining a phase error and a gain error on each said sub-channel in said frequency domain respectively utilizing a phase error detector and a gain error detector, disposed in parallel relation within the joint carrier synchronization and channel equalization device;
    (B) obtaining in the joint carrier synchronization and channel equalization device an execution carrier frequency offset factor, an execution phase compensation factor based on said phase error on each said sub-channel in said frequency domain, and obtaining an execution gain compensation factor based on said gain error on each said sub-channel in said frequency domain;
    (C) multiplying in the joint carrier synchronization and channel equalization device a second reception signal sample of a second OFDM symbol by said execution carrier frequency offset factor, hereby eliminating a phase offset of said second reception signal sample in a time domain;
    (D) outputting in the joint carrier synchronization and channel equalization device a second received sub-channel signal on each said sub-channel in said frequency domain by using said second reception signal sample; and
    (E) multiplying said execution gain compensation factor and said execution phase compensation factor in the joint carrier synchronization and channel equalization device by said second received sub-channel signal, thus compensating a magnitude distortion and a phase distortion of said second received sub-channel signal on each said sub-channel in said frequency domain.

2. The joint carrier synchronization and channel equalization method for OFDM systems as claimed in claim 1, wherein
    in said step (E), said execution gain compensation factor and said execution phase compensation factor are multiplied by said second received sub-channel signal in sequence respectively, or said execution phase compensation factor and said execution gain compensation factor are multiplied by said second received sub-channel signal in sequence respectively.

3. The joint carrier synchronization and channel equalization method for OFDM systems as claimed in claim 1, wherein
    said step (A) further comprising the following steps:
    (A1) receiving said first reception signal sample and an estimated initial carrier frequency offset factor, multiplying said sample and said factor, then outputting a resulting product thus obtained;
    (A2) performing discrete Fourier transformation on said first reception signal sample, and outputting said first received sub-channel signal on each said sub-channel in said frequency domain;
    (A3) multiplying said first received sub-channel signal by an initial gain compensation factor and an initial phase compensation factor respectively, hereby outputting a first received sub-channel equalization signal, in compensating said magnitude distortion and said phase distortion of said first received sub-channel signal on each said sub-channel in said frequency domain;

(A4) performing a slicing processing for said first received sub-channel equalization signal, and outputting a sub-channel decision signal;

(A5) subtracting said first received sub-channel equalization signal from said sub-channel decision signal, thus outputting a decision error signal; and (A6) obtaining said phase error and said gain error of said first received sub-channel signal on said frequency domain sub-channel through detecting said the decision error signal and said sub-channel decision signal.

4. The joint carrier synchronization and channel equalization method for OFDM systems as claimed in claim 3, wherein in said step (A3), said initial gain compensation factor and said initial phase compensation factor are multiplied by said first received sub-channel signal in sequence respectively, or said initial phase compensation factor and said initial gain compensation factor are multiplied by said first received sub-channel signal in sequence respectively.

5. The joint carrier synchronization and channel equalization method for OFDM systems as claimed in claim 3, wherein said initial gain compensation factor and said initial phase compensation factor are predetermined values respectively.

6. The joint carrier synchronization and channel equalization method for OFDM systems as claimed in claim 5, wherein said initial gain compensation factor and said initial phase compensation factor on a kth sub-channel is acquired based on a training symbol and represented as $$\hat{G}_k = \frac{|X_k|}{|Y_k|}$$

$$\hat{\theta}_k = \tan^{-1}(X_k \cdot Y_k^*)$$

wherein $X_k$ and $Y_k$ are said transmitted and said received training symbols on said kth sub-channel respectively.

7. The joint carrier synchronization and channel equalization method for OFDM systems as claimed in claim 3, wherein said phase error is $\epsilon_{k,p}=\text{Im}(\hat{X}_k E^*_k)$, wherein, Im(•), and * represent an imaginary-part, and a complex-conjugate operators, $\hat{X}_k$ is said sub-channel decision signal, and $E_k$ is a decision error value of said decision error signal.

8. The joint carrier synchronization and channel equalization method for OFDM systems as claimed in claim 3, wherein said gain error is $\epsilon_{k,g}=\text{Re}(\hat{X}_k E^*_k)$, wherein, Re(•), and * represent a real-part, and said complex-conjugate operators, $\hat{X}_k$ is said sub-channel decision signal, and $E_k$ is said decision error value of said decision error signal.

9. The joint carrier synchronization and channel equalization method for OFDM systems as claimed in claim 3, wherein a power of said decision error signal is $E_k=[|\hat{X}_k-\hat{Y}_k|^2]$, wherein, E[•] is an expectation operator, $\hat{X}_k$ is said sub-channel decision signal, and $\hat{Y}_k$ is said first received sub-channel equalization signal.

10. The joint carrier synchronization and channel equalization method for OFDM systems as claimed in claim 1, wherein said execution gain compensation factor is obtained through: inputting said gain error on each said sub-channel in said frequency domain into a loop filter of a gain equalization loop, thus obtaining said execution gain compensation factor.

11. The joint carrier synchronization and channel equalization method for OFDM systems as claimed in claim 1, wherein said execution phase compensation factor is obtained through said following steps:

inputting said phase error on each said sub-channel in said frequency domain into a loop filter of an inner loop, thus obtaining a compensation phase; and calculating said execution phase compensation factor based on said compensation phase.

12. The joint carrier synchronization and channel equalization method for OFDM systems as claimed in claim 1, wherein said execution gain compensation factor is a real number.

13. The joint carrier synchronization and channel equalization method for OFDM systems as claimed in claim 1, wherein in said step (D), a discrete Fourier transformation is performed on said second reception signal sample, thus outputting said second received sub-channel signal on each said sub-channel in said frequency domain.

14. A joint carrier synchronization and channel equalization method for OFDM systems that is suitable for use in a receiver of said OFDM (Orthogonal Frequency Division Multiplexing) systems, comprising the following steps:

(A) receiving a first reception signal sample of a first OFDM symbol, then outputting a first received sub-channel signal on each sub-channel in a frequency domain, meanwhile, obtaining a phase error and a gain error on each said sub-channel in said frequency domain;

(B) obtaining an execution carrier frequency offset factor, an execution phase compensation factor based on said phase error on each said sub-channel in said frequency domain, and obtaining an execution gain compensation factor based on said gain error on each said sub-channel in said frequency domain;

(C) multiplying a second reception signal sample of a second OFDM symbol by said execution carrier frequency offset factor, hereby eliminating a phase offset of said second reception signal sample in a time domain;

(D) outputting a second received sub-channel signal on each said sub-channel in said frequency domain by using said second reception signal sample; and (E) multiplying said execution gain compensation factor and said execution phase compensation factor by said second received sub-channel signal, thus compensating a magnitude distortion and a phase distortion of said second received sub-channel signal on each said sub-channel in said frequency domain, wherein said execution carrier frequency offset factor is obtained though the following steps:

performing summation and then averaging of said phase error for all said frequency domain sub-channels, thus obtaining an average phase error;

inputting said average phase error into a loop filter of an outer loop, hereby obtaining an estimated residual carrier frequency offset (CFO);

performing summation of said estimated residual CFO and an initial estimated CFO, thus obtaining a compensation CFO; and calculating said execution carrier frequency offset factor based on said compensation CFO.

15. The joint carrier synchronization and channel equalization method for OFDM systems as claimed in claim 14, wherein said average phase error is $$\bar{\varepsilon}_p = \frac{1}{K} \sum_{\substack{k=-K/2 \\ k \neq 0}}^{K/2} \varepsilon_{k,p},$$

wherein, k is said sub-channel index in said frequency domain, $\epsilon_{k,p}$ is said phase error on kth sub-channel.

16. The joint carrier synchronization and channel equalization method for OFDM systems as claimed in claim 14, wherein said execution carrier frequency offset factor is $e^{-j\phi_n}$, wherein, $\phi_n = 2\pi\Delta\hat{f}nT$, $\Delta\hat{f}$ is said compensation CFO, and T is a single signal sample interval.

17. A joint carrier synchronization and channel equalization method for OFDM systems that is suitable for use in a receiver of said OFDM (Orthogonal Frequency Division Multiplexing) systems, comprising the following steps:

(A) receiving a first reception signal sample of a first OFDM symbol, then outputting a first received sub-channel signal on each sub-channel in a frequency domain, meanwhile, obtaining a phase error and a gain error on each said sub-channel in said frequency domain;

(B) obtaining an execution carrier frequency offset factor, an execution phase compensation factor based on said phase error on each said sub-channel in said frequency domain, and obtaining an execution gain compensation factor based on said gain error on each said sub-channel in said frequency domain;

(C) multiplying a second reception signal sample of a second OFDM symbol by said execution carrier frequency offset factor, hereby eliminating a phase offset of said second reception signal sample in a time domain;

(D) outputting a second received sub-channel signal on each said sub-channel in said frequency domain by using said second reception signal sample; and (E) multiplying said execution gain compensation factor and said execution phase compensation factor by said second received sub-channel signal, thus compensating a magnitude distortion and a phase distortion of said second received sub-channel signal on each said sub-channel in said frequency domain, wherein said execution phase compensation factor is obtained through said following steps:

inputting said phase error on each said sub-channel in said frequency domain into a loop filter of an inner loop, thus obtaining a compensation phase; and calculating said execution phase compensation factor based on said compensation phase and wherein said execution phase compensation factor is $e^{-jk}$, and said compensation phase is $\hat{\theta}_k$.

* * * * *